United States Patent [19]

Braun

[11] Patent Number: 5,611,137

[45] Date of Patent: Mar. 18, 1997

[54] MACHINE TOOL, MORE PARTICULARLY FOR DRILLING AND MILLING

[75] Inventor: Hans-Dieter Braun, Frittlingen, Germany

[73] Assignee: Maschinenfabrik Berthold Hermle AG, Gosheim, Germany

[21] Appl. No.: 549,238

[22] Filed: Oct. 27, 1995

[30] Foreign Application Priority Data

Nov. 19, 1994 [DE] Germany .......................... 44 41 253.3

[51] Int. Cl.⁶ ...................................................... B23C 1/06
[52] U.S. Cl. .......................... 29/560; 29/27 A; 29/26 A; 409/137; 409/189; 409/221; 409/202; 409/235
[58] Field of Search ...................................... 409/163, 165, 409/168, 183, 189, 190, 191, 197, 198, 205, 219, 221, 202, 212, 31, 32, 33; 451/405, 364, 10, 11; 29/27 R, 27 A, 27 C, 26 A, 560, DIG. 94, DIG. 101, DIG. 102

[56] References Cited

U.S. PATENT DOCUMENTS

| 4,523,360 | 6/1985 | Giovanola | 29/DIG. 101 |
| 4,955,770 | 9/1990 | Kitamura | 409/134 |
| 4,999,895 | 3/1991 | Hirose et al. | 409/134 |
| 5,052,089 | 10/1991 | Gadaud et al. | 29/27 R |
| 5,117,552 | 6/1992 | Babel | 409/235 |
| 5,154,643 | 10/1992 | Catania et al. | 409/202 |

Primary Examiner—M. Rachuba
Assistant Examiner—Christopher Kirkman
Attorney, Agent, or Firm—Browdy and Neimark

[57] ABSTRACT

A machine tool more particularly for drilling and milling, possesses a machine bed, on which a power driven longitudinal slide is adapted to run horizontally on rails. A machining head having a rotary drive device for at least one table forming part of said head, is power moved on the longitudinal slide in at least one further direction of movement. The machine bed possesses two spaced lateral walls, whose intermediate space is designed to serve as a machining zone for receiving at least one work holding means. On the two lateral walls two parallel guide rails are arranged for the longitudinal slide, a third guide rail being arranged with an offset in the longitudinal direction between the two other guide rails. The longitudinal slide is guided using three guide elements on the three guide rails, the power drive being at or adjacent to the central guide rail. On this arrangement a clamping yoke of relatively light design may be employed, which only requires one central drive. Transverse forces caused by twisting in the case of eccentric loading act perpendicularly on the guide elements, which are accordingly better able to withstand the forces.

22 Claims, 4 Drawing Sheets

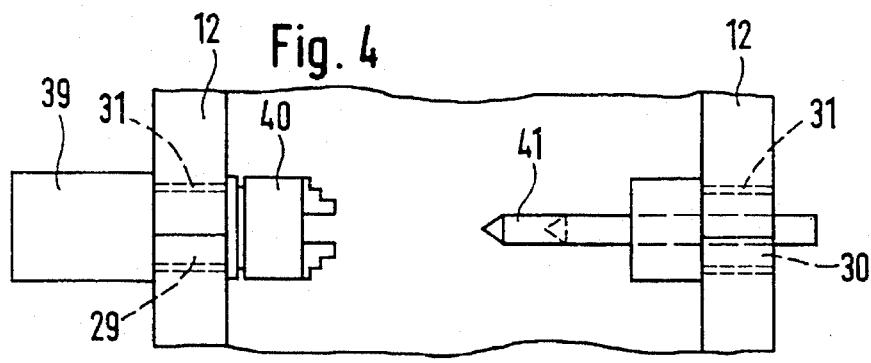
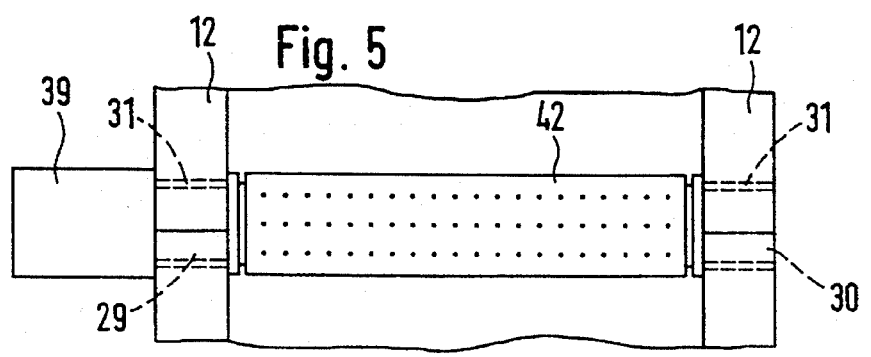
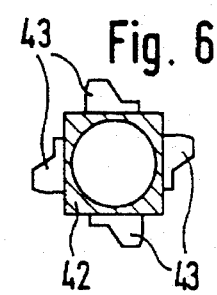
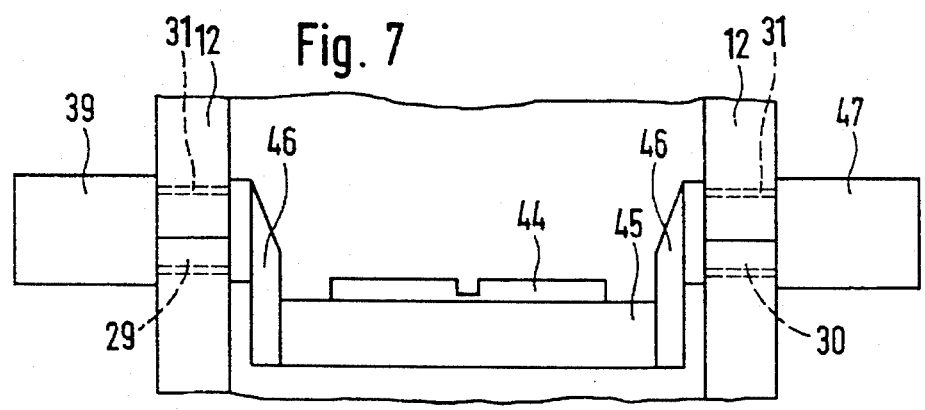
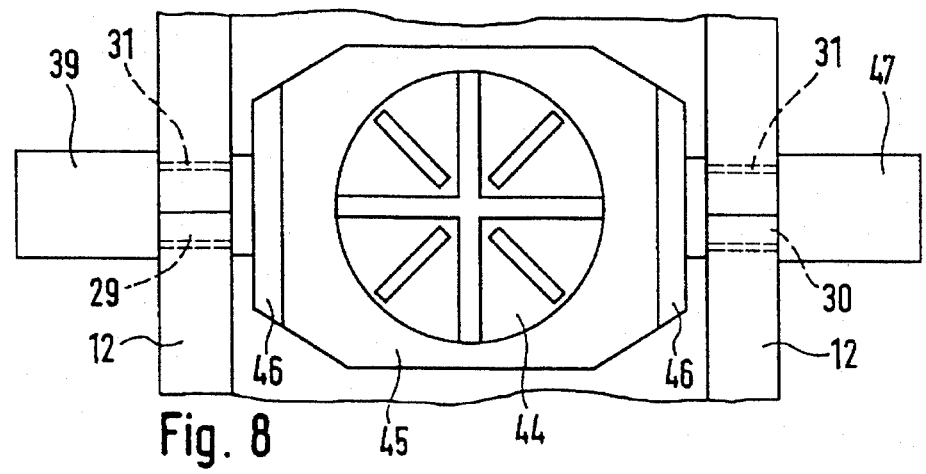

MACHINE TOOL, MORE PARTICULARLY FOR DRILLING AND MILLING

BACKGROUND OF THE INVENTION

The invention relates to a machine tool more particularly for drilling and milling, comprising a machine bed, guide rails mounted on said bed, a power driven longitudinal slide adapted to run horizontally on said rails on said bed, a machining head, and a rotary drive device forming part of said head for at least one tool, said head being adapted to be power moved on the longitudinal slide in at least one further direction of movement.

THE PRIOR ART

A machine tool of this type designed in the form of a milling machine is disclosed in the German patent publication 4,203,994 C. In the case of this widely employed type of milling machine the slide moves in the longitudinal direction and the machining head is arranged on the slide for vertical motion. Movement in the transverse direction is performed using a suitably driven work table. Complex measures must be taken to protect the drive of such table in the bottom part of the machine against material such as shavings and lubricant during operation. In the case of a major lateral deflection of the work table there is the danger of deformation, albeit only slight, owing to the mass of the machine and of the work and owing to forces acting by way of the tool so that in practice the work table does not move along a linear path but along a circular path with a radius of several kilometers in order to compensate for deformation in order to be able to perform precision milling.

So-called gantry milling machines are known as well, in the case of which the longitudinal slide bearing the machining head runs on two parallel rails, which for their part are arranged on the top side of two lateral walls of the machine's bed. In this case the longitudinal slide is borne by four guide elements on the two guide rails. Furthermore for 5 axis machining either the machining head must be complex in design so that it can be pivoted, or the work table, which is borne on one bottom wall of the machine's bed, must be designed to pivot with the result that there is a danger of lubricant and coolant finding its way into the drive of the work table unless complex, expensive sealing means are provided.

SHORT SUMMARY OF THE INVENTION

One object of the invention is to create a machine tool more particularly for drilling and milling of the type initially mentioned, in the case of which, in a manner similar to a gantry construction, all drive elements, guides and bearings are arranged above the dirt, coolant and lubricant zone, but in which however the longitudinal slide makes do with a simpler and less expensive drive device while maintaining the same or an even higher degree of machining precision.

In order to achieve these and/or other objects appearing from the present specification, claims and drawings, in the present invention the machine bed possesses two spaced lateral walls defining an intermediate space between them, which is designed in the form of a machining zone adapted to accommodate at least one work holding means, on the two lateral walls two parallel guide rails for the longitudinal slide are arranged, a third guide rail is arranged which is essentially half way between the two other guide rails with an offset in the longitudinal direction, and the longitudinal slide is guided using three guide elements on the three guide rails, the power drive being at or adjacent to the central guide rail.

Firstly the machine tool in accordance with the invention possesses all the advantages of a "gantry" construction. All the main working movements are performed by the tool, whereas the work to be machined rests on the machine's bed. Accordingly the mass moved is constant and the machine tool may readily be bound in place at a palette station, the tool changer attached in position being simple. Owing to the stationary arrangement of the work to be machined in the machine bed, that is to say between the two lateral walls, all drive elements, guide elements and bearings are above the work, that is to say outside the dirt area, into which shavings, lubricant and coolant descend. Owing to the arrangement above the machine bed all drive elements can be readily reached for servicing and substitution. The paths of force transmission between the tool and the work are short and lead to a high degree of rigidity of the machine. In this respect a compact manner of construction is produced, that is to say the overall dimensions are small for the large size of machining cut possible with the machine tool. The machine comprises but a few components and can be clad in simple manner. Owing to the triple point support for the longitudinal slide designed in the form of a gripping yoke the design is lighter in weight and only a single central drive at or adjacent to the central guide rail is required, something leading to a significant reduction in costs in comparison with known arrangements. Since the drive acts directly on the central guide element, it is directly on the displacement measuring system, something leading to precise machining. The resulting forces, which are produced by skew running in the case of eccentric loading of the longitudinal slide, act perpendicularly on the guide element with the result that the forces which occur may be better taken up. This as well is something conducive of an increase in machining precision or, respectively, a cheaper and simpler design of the guide elements and guide rails.

The measures defined in the claims relate to advantageous further developments and improvements in the novel machine tool as indicated above.

All three guide rails are preferably arranged in the same horizontal plane and, after production of the blank of the machine bed, may hence be ground by a larger machine tool after attachment in it.

The central guide rail is at least partially on a transverse wall connecting the two lateral walls at terminal parts thereof, such transverse wall contributing to an increase in the structural rigidity of the machine's bed. In this case the transverse wall will preferably possess a central spur on its side opposite to the machining zone in the longitudinal direction of the machine bed, such spur serving as a support for the central guide rail and partially taking up the weight of the longitudinal slide.

For exactly fixing and aligning a work table on the lateral walls the machining zone has support surfaces for the table. The support surfaces are in this respect designed in the form of surfaces machined by the machining head and which accordingly lie in a plane which is exactly parallel to the plane of motion of the longitudinal slide. The fixing of the work table is in this case performed at a particularly structurally rigid part of the machine bed.

At its lowermost terminal part the machining zone possesses an ejection opening for shavings and lubricant, which fall under gravity automatically through the ejection opening. This is aided by a funnel-like taper of the lateral limiting surfaces of the machining zone toward the ejection opening.

Underneath the ejection opening there is preferably a receiving container and/or a removal device, at least for the shavings.

In order to permit and ensure motion of the machining head or, respectively, of the tool arranged thereon in all three possible directions thereof, the machining head is arranged so that it can be power moved vertically on a transverse slide, which transverse slide is moved by power on the longitudinal slide in the transverse direction.

Owing to the complex and compact form of the machine bed constituting a machine base, the same can advantageously consist of a cast mineral material, more particularly polymer concrete. Accordingly there is on the one hand a high degree of structural rigidity and on the other hand a reduction in costs, exact dimensions on removal from the mold and advantages as regards machining.

In an advantageous design the lateral walls can be employed additionally as carriers for work holding means, such as pivoting tables, a fastening point for at least one work holding means being provided at each of the two lateral walls, the two fastening points being aligned in a horizontal line athwart the longitudinal direction of the guide rail. The fastening points are in this case preferably through openings with a circular of polygonal form. Such receiving recesses may for example be precision machined together with the guide rails once the machine bed has been clamped in place so that same possess an exact mutual alignment. Such work holding means may be supported so that they may be turned by power or manually and for instance machining of a surface inclined about two axes is possible. In this case the forces occurring during milling are adjacent to transverse guide in the receiving recesses with the result that the force transmission path is particularly short.

A convenient design of a work holding means may comprise a power driven, rotary chuck on the one hand and on the other hand a counter-bearing, such as a center, which may be mounted at one or both fastening points. This leads to an indexing fixture with a counter-holder.

As an alternative to this it is also possible to rotatably mount a work table or a work holding means having one or more clamping surfaces at or in the two fastening points, at least one of the fastening points possessing a powered rotary drive or a manual rotary adjustment device. The work holding means may be designed in the form of a roller with a polygonal cross section, work pieces being held clamped at each external surface and being machined in sequence by suitable rotation of the work holding device. The work can also be connected with rotary bearings using lever-like holding elements and be arranged offset in relation to the axis of rotation.

The fastening points in the form of receiving recesses serve more particularly to accommodate or anchor the rotary bearings and/or the power rotary drives for the work holding means. The rotary power drives are in this case preferably arranged on the outer side or sides of the lateral walls so that outside the operating zone they are not subjected to any shavings, coolant and lubricant. Furthermore they are readily accessible for maintenance and repair operations.

The different work holding means are able to be mounted at the fastening points in an interchangeable or replaceable fashion so that every machine may be configured and upgraded in a customized manner. In the simplest possible design there is then only the provision of a work table permanently anchored to the bearer surfaces of the lateral walls. The working zone is then practically maintained without any limitation in the case of all optional work holding devices.

The receiving recesses are preferably provided with metallic bearing bushings, which are anchored or cast in the machine beds, of cast mineral material (as for example polymer concrete) so that it is no longer necessary to provide additional cast housings for the bearings. Such bearing bushings are machined in the already described manner together with the longitudinal guides with the machine bed firmly clamped in position in order to achieve exact mutual alignment.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

FIG. 4 shows an indexing fixture inserted in the two receiving recesses in the lateral walls and consisting of a chuck and a center.

FIG. 5 shows an alternative form of work holding device, able to be inserted into the receiving recesses, having four clamping surface.

FIG. 6 shows the work holding device of FIG. 5 in cross section.

FIG. 7 shows an alternative design of a power rotated work table able to be inserted in the receiving recesses.

FIG. 8 shows the work table after rotation through 90° after the A axis.

DETAILED ACCOUNT OF WORKING EMBODIMENTS OF THE INVENTION

Figure 1:
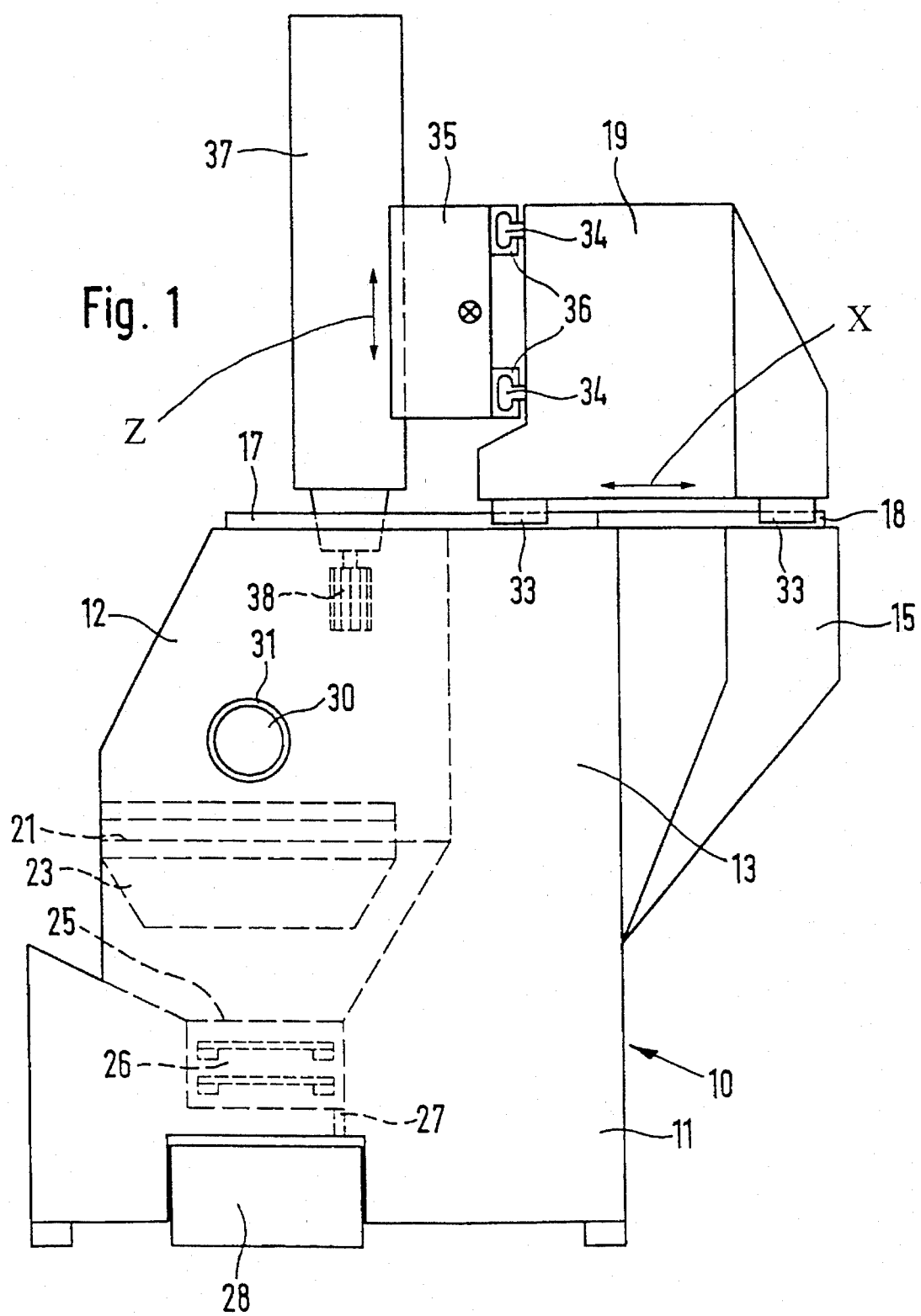
FIG. 1 shows a working embodiment of a machine tool for drilling and milling in a lateral elevation.
Figure 2:
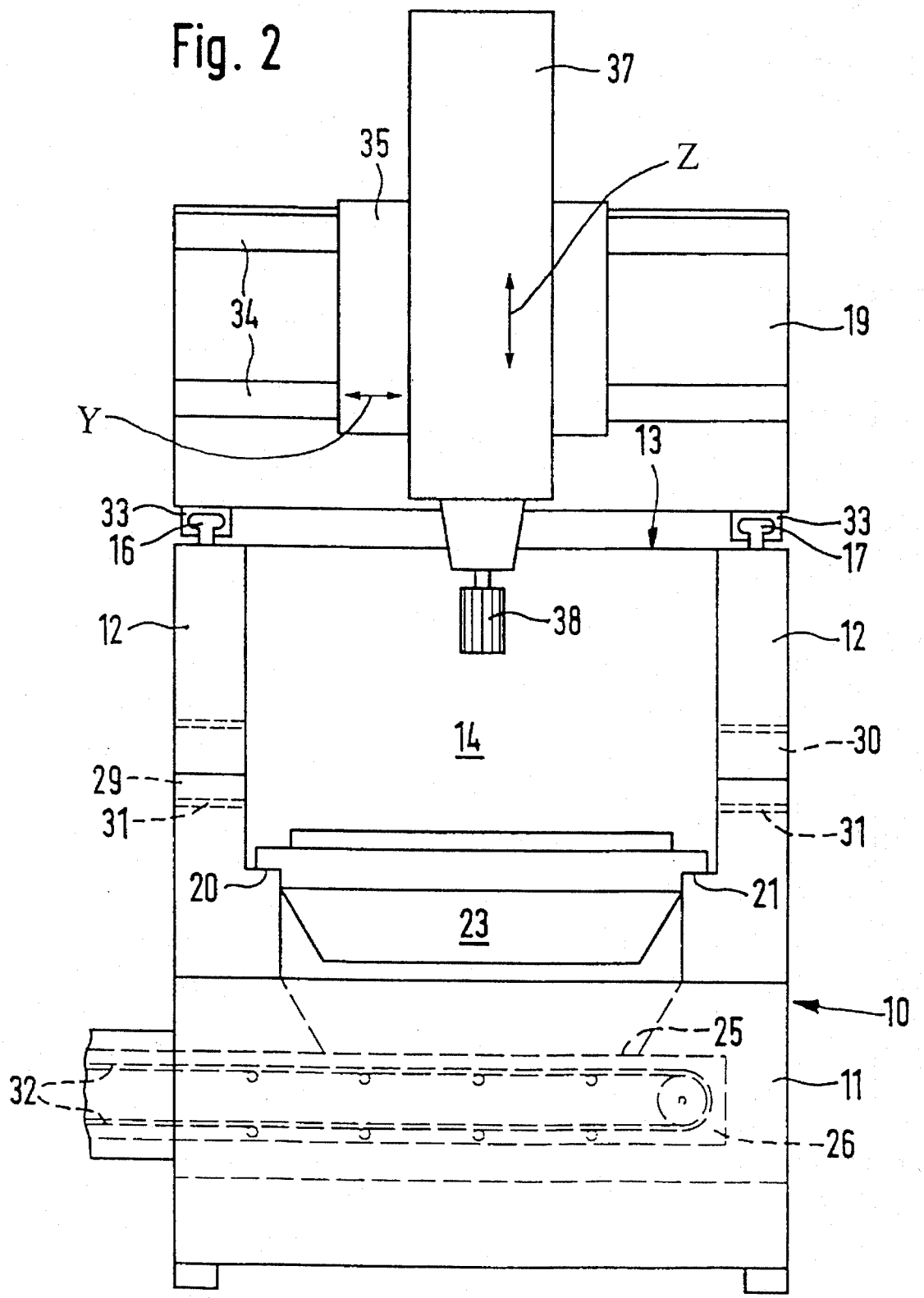
FIG. 2 shows the same machine tool in a front view.
Figure 3:
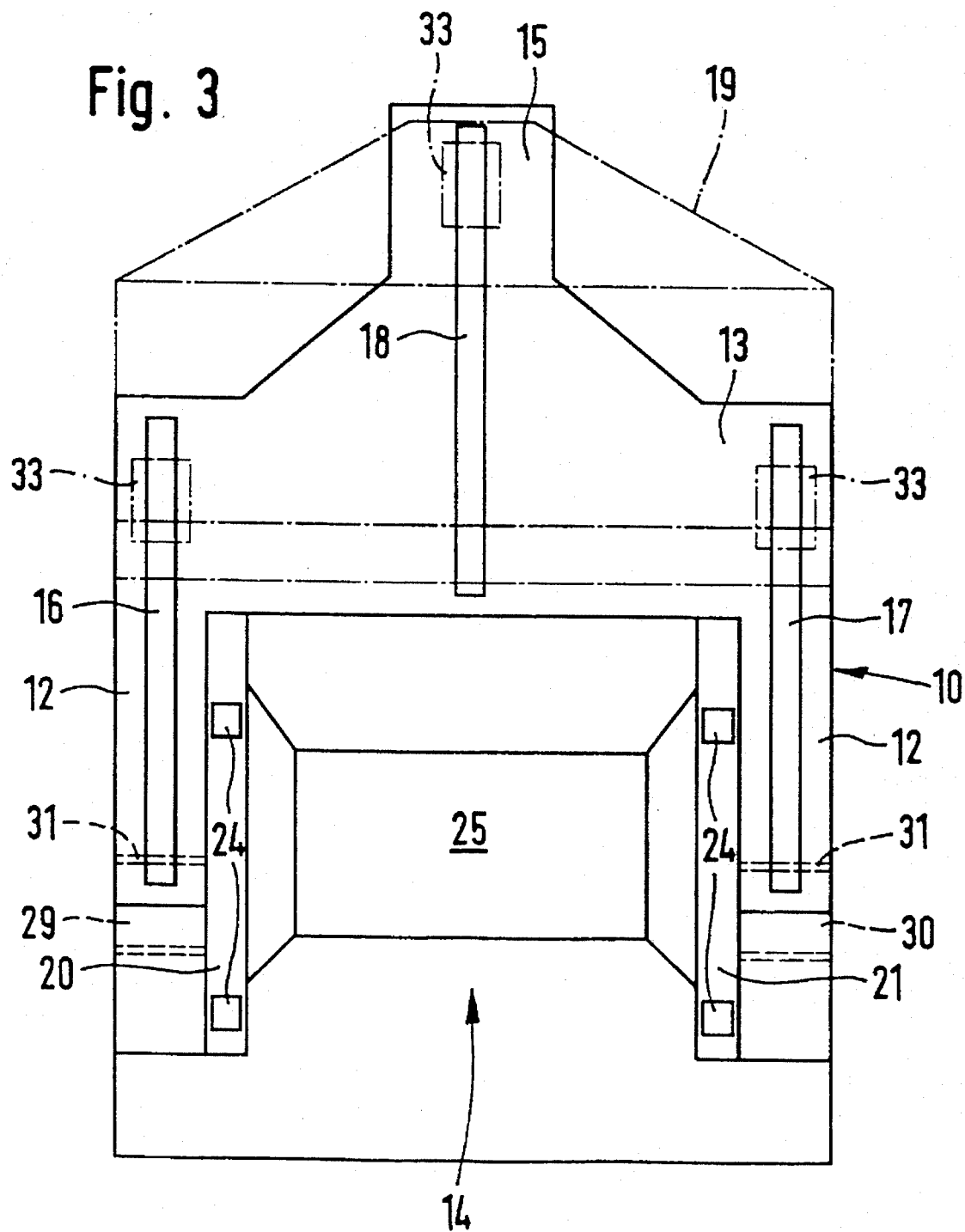
FIG. 3 shows the same machine tool in a view from above, the longitudinal slide only being indicated in broken lines and the transverse slide and machining head being omitted in order to make the drawing more straightforward.

The drilling and milling machine illustrated in FIGS. 1 through 3 may naturally also be employed as a simple drilling or grinding or as a combined machine tool.

A machine bed 10 possesses a lower base zone 11 from which two lateral walls 12 extend upwardly at opposite edge zones. The walls are termed "lateral" here and in the claims since they are disposed on either of the two sides of the machine, that is, one either hand of a person facing the front of the machine. They extend in the longitudinal direction. These lateral walls 12 are connected together at their terminal zones by a transverse wall 13. The zone which is limited by the lateral walls 12 and the transverse wall 13 at their side and below by the base zone 11 constitutes the machining zone 14 of the milling machine. From the center zone of the transverse wall 13 there extends, opposite to the side opposite to the machining zone 14, a central rearwardly directed spur 15 with the result that the lateral wall 13 together with the central spur 15 as seen in FIG. 3 has a triangular top side.

On the two lateral walls 12 two parallel guide rails 16 and 17 are attached aligned with the longitudinal direction of such lateral walls 12 and, respectively, with the longitudinal direction of the machine bed 10. The longitudinal direction is indicated by the arrow labeled X in FIG. 1. The vertical direction is labeled Z. A third guide rail 18 is mounted between the guide rails 16 and 17 parallel to the same with an offset in the longitudinal direction, on the central spur 15 and the transverse wall 13. These three guide rails 16 through 18 are arranged in the same horizontal plane, but however it is for example also possible to arrange the third guide rail 18 in another plane or to design in the form of a twin guide rail. A longitudinal slide 19 which runs on the guide rails 16 through 18, as will be described below, must then be suitably adapted.

In their lower part the mutually opposite inner sides of the lateral walls 12 possess a respective ledge 20 and 21, such ledges 20 and 21 providing lateral support surfaces for a work table 23, which is able to be secured fixedly to the machine bed 10 in its support position depicted in FIG. 2 in a manner which is not illustrated and serves for clamping work in position which is to be machined. The two ledges 20 and 21 for this purpose possess four precision machined support points 24, which must be arranged exactly parallel to the guide rails 16 through 18.

At a lower level than the plane of the support points 24 the interior space of the machine bed 10 tapers like a funnel as far as a lower ejection opening 25. Underneath the ejection opening 25 the machine bed 10 possesses a removal duct 26, which as shown in FIG. 1 is connected via one or more outlet ducts 27 with a recess to receive a disposal container 28 for shavings, lubricant and coolant as depicted in FIG. 1.

In each of the lateral walls 12, above the plane of the support points 24, a respective through receiving recess 29 and 30 is formed, the two receiving recesses 29 and 30 being aligned in a horizontal direction athwart the longitudinal direction of the guide rails. In the two receiving recesses 29 and 30 bearing bushings 31 are inserted.

The machine bed 10 consists of a cast mineral material, as for example polymer concrete, only the guide rails 16 through 18, the support points 24 and the bearing bushings 31 being manufactured of steel. Such steel components are cast in position during casting of the machine bed 10 or are later inserted in suitable molded recesses and anchored. The machine bed 10 is then clamped in position in a machine tool (not illustrated) for precision machine, such machine tool producing the sliding and running surfaces on the guide rails 16 through 18 parallel to one another and in an exact plane. Furthermore the bearing bushings 31 are precision machined in exact vertical alignment to the guide rails. Since such machining operations may be performed from the outside, simple machining is possible. Naturally the machine bed 10 may also be manufactured as metallic bed. On casting such machine bed 10 it would be possible to provide cavities therein (not illustrated) to save weight.

In the disposal duct a disposal conveyor belt 32 is arranged, which passes the downwardly falling shavings or other materials resulting from operation of the plant laterally to a waste receiving device (not illustrated) as same are produced in the course of machining. In a more simply designed system instead of a disposal conveyor belt 32 it would also be possible to provide a collecting container in the disposal duct 26. The lubricant and coolant will then flow respectively through the outlet duct 27 to the waste container 28. From the latter the lubricant and coolant are returned in a conventional manner, not described here, after suitable filtration, to the coolant the lubricant circuit of the milling machine.

The longitudinal slide 19 is borne in a longitudinally sliding fashion by means of three guide elements 33 on the three guide rails 16 through 18. In this respect the two outer guide elements are arranged on the bottom side of the front zone and the central guide element in the rear zone on the bottom side centrally on the longitudinal slide 19 so that punctuate support is achieve. A power drive, not illustrated, acts on the central guide element 33, and a displacement measuring system, not illustrated either, is arranged as well on the central guide element or, respectively, on the central guide rail 18.

On its front side or end the longitudinal slide 19 possesses two superposed transverse rail 34, on which a power driven transverse slide 35 runs in the transverse direction by the intermediary of guide elements 36. On this transverse slide 35 a machining head 37 is supported for vertical movement by the power drive (not illustrated) so that in principle motion of the tools 38 secured to the machining head in a replaceable manner in all three directions of travel is possible.

A tool changer, not illustrated, can be arranged on one of the two side walls 12 and for example perform any respective tool change necessary adjacent to front oblique surface of the lateral walls.

In the receiving recesses 29 and 30 or, respectively, in the bearing bushings 31 arranged there, it is possible to employ different tool holding devices selective, as is indicated for example FIG. 4 through 8. Owing to this feature the milling machine can be supplied with the stationarily arranged work table 23 and the additional work table holding means can be supplied at the same time optionally or may be later acquired and utilized.

A first work holding means, adapted to be employed in the bearing bushings 31, is illustrated in FIG. 4 and constitutes an indexing fixture. In the left hand bearing bushing 31 are chuck 40 provided with a power drive 39 is rotatably supported, the power drive 39 being placed on the outer side of the machine bed 10. In the opposite bearing bushing 31 a center 41 is arranged in alignment and rotatably, such center being able to be adjusted in an adjustment direction toward the chuck 40. A piece of work placed between the chuck 40 and the center 41 may in this manner be machined, milled, drilled or ground in different desired angular settings. The chuck 40 with the rotary power drive 39 and the center 41 may be rapidly inserted and removed in the respective bearing bushings 31 (or even in a reverse order). The necessary rotary bearings are sealed off from the machining zone.

FIGS. 5 and 6 show a further embodiment of a work holding means. Instead of the chuck 40 there is in this case a work holding means 42 possessing four clamping surfaces and held in a rotatable fashion in the two bearing bushings 31 at its terminal or end parts so that it may be turned by a rotary power drive 39. As shown in FIG. 6 pieces of work 43 are depicted for instance in on all four clamping surfaces in the clamped state. In a shorter design the work holding means 42 may also be supported at one end or side, the center 41 not being required for various applications of the indexing fixture as shown in FIG. 4.

In the case of the further work holding means illustrated in FIGS. 7 and 8 a tool table 45, provided with lever-like holding elements 46 arranged on opposite sides, is provided which has a round table 44, such holding elements 46 serving for rotatably supporting the tool table 45 in the respective two bearing bushings 31. At each outer a respective power drive 39 and 47 is arranged, it however being possible to use a single rotary power drive 39 in a simpler case. Owing to the holding elements 46 the work table 45 is offset out of the axis of rotation. When work is clamped on the round table 44 five axis machining is feasible.

Instead of power drives 39 and, respectively, 47 it is also possible to provide manually operated rotary adjustment means, by which the respective work holding means may be set to different machining angles.

While for the lathe several work holding means illustrated in FIGS. 4 through 8 or further work holding means are provided for interchangeable use, it is also possible to employ different power drives or a single rotary power drive 39 for the different work holding means. On the rotary power drive 39 set and fixed in a bearing bushing 31, it is possible, using its rotary bearing, for the respective tool holding means to be mounted in a replaceable manner so that the different optional holding means are designed in a sort of modular system.

As a modification of the embodiment of the invention depicted in FIGS. 1 through 3 it is naturally possible to provide a vertical slide, running horizontally on the longitudinal slide 19 instead of the transverse slide 35, the machining head 37 then running transversely on such vertical slide.

Moreover the receiving recesses 29 and 30 may have any form departing from the circular form indicated, as for example a polygonal form. Instead of such receiving recesses it is possible in principle to have differently designed fastening points, which are suitable for holding various different rotary work holding means in a suitable fashion.

I claim:

1. A machine tool for drilling and milling, comprising a machine bed, guide rails mounted on said bed, a power driven longitudinal slide adapted to run horizontally on said rails on said bed, a machining head, and a rotary drive device forming part of said head for at least one tool, said head being adapted to be power moved on the longitudinal slide in at least one further direction of movement, wherein the machine bed possesses two spaced lateral walls defining an intermediate space between them, which is designed in the form of a machining zone adapted to accommodate at least one work holding means, on the two lateral walls two parallel guide rails for the longitudinal slide are arranged, a third guide rail is arranged which is approximately half way between the two other guide rails with an offset in the longitudinal direction, and the longitudinal slide is guided using three guide elements on the three guide rails, the power drive being at or adjacent to the central guide rail.

2. The machine tool as set forth in claim 1, wherein the guide rails are arranged in a common horizontal plane.

3. The machine tool as set forth in claim 1, wherein said central guide rail is at least partly arranged on a center zone of a transverse wall between the two lateral walls.

4. The machine tool as set forth in claim 3, wherein said transverse wall has, at its end opposite to the machining zone, a central spur in the longitudinal direction of the machine bed, such spur serving as a support for the central guide rail.

5. The machine tool as set forth in claim 1, wherein on the lateral walls the machining zone possesses support surfaces for a work table.

6. The machine tool as set forth in claim 5, wherein the support surfaces are in the form of surfaces machined by the machining head and accordingly lie in a plane parallel to the plane of motion of the longitudinal slide.

7. The machine tool as set forth in claim 1, wherein the machining zone possesses an ejection opening for shavings, lubricant and coolant at its lowermost terminal part.

8. The machine tool as set forth in claim 7, wherein lateral limiting surfaces of the machining zone draw together toward the ejection opening in the manner of a funnel.

9. The machine tool as set forth in claim 7, wherein underneath the ejection opening a collecting container removal means is provided, at least for the shavings.

10. The machine tool as set forth in claim 1, wherein the machining head is adapted to be moved on a further slide vertically or in the transverse direction by power, such further slide being adapted to be moved on the longitudinal slide in the respectively other direction by power.

11. The machine tool as set forth in claim 1, wherein the machine bed includes a cast mineral material.

12. The machine tool as set forth in claim 1, comprising means defining a fastening point at each of the two lateral walls for at least one work holding means, the two fastening points being aligned in a common horizontal line athwart the longitudinal direction of the guide rails.

13. The machine tool as set forth in claim 12, wherein the fastening points are constituted by receiving recesses.

14. The machine tool as set forth in claim 13, wherein the receiving recesses are constituted by through openings with a circular or polygonal form.

15. The machine tool as set forth in claim 1, wherein the work holding means comprises a power rotatable chuck and a center mounted in the two receiving recesses on each of said spaced lateral walls.

16. The machine tool as set forth in claim 1, comprising a work table or a work holding means possessing one or more clamping surfaces, such work table or such holding means being rotatably mounted at or in two fastening points and possessing at one of the fastening points at least a power rotated drive or a manual rotary setting means.

17. The machine tool as set forth in claim 16, wherein said work holding means is designed like a roller with a polygonal cross section.

18. The machine tool as set forth in claim 16, wherein said work table is connected by means of lever-like holding elements with rotary bearings at or in the fastening points and is arranged offset in relation to the axis of rotation.

19. The machine tool as set forth in claim 15, wherein said fastening points designed in the form of receiving recesses are provided to accommodate or to anchor rotary bearings and rotary power drives for the work holding means.

20. The machine tool as set forth in claim 15, wherein rotary power drives are arranged at the outer side or sides of the lateral walls.

21. The machine tool as set forth in claim 15, comprising various different work holding means adapted to be mounted in an interchangeable fashion at the fastening points.

22. The machine tool as set forth in claim 13, wherein the fastening points designed in the form of receiving recesses are provided with metallic bearing bushings, cast or otherwise anchored in the machine bed, said bushings being of a cast mineral material.

* * * * *